United States Patent Office.

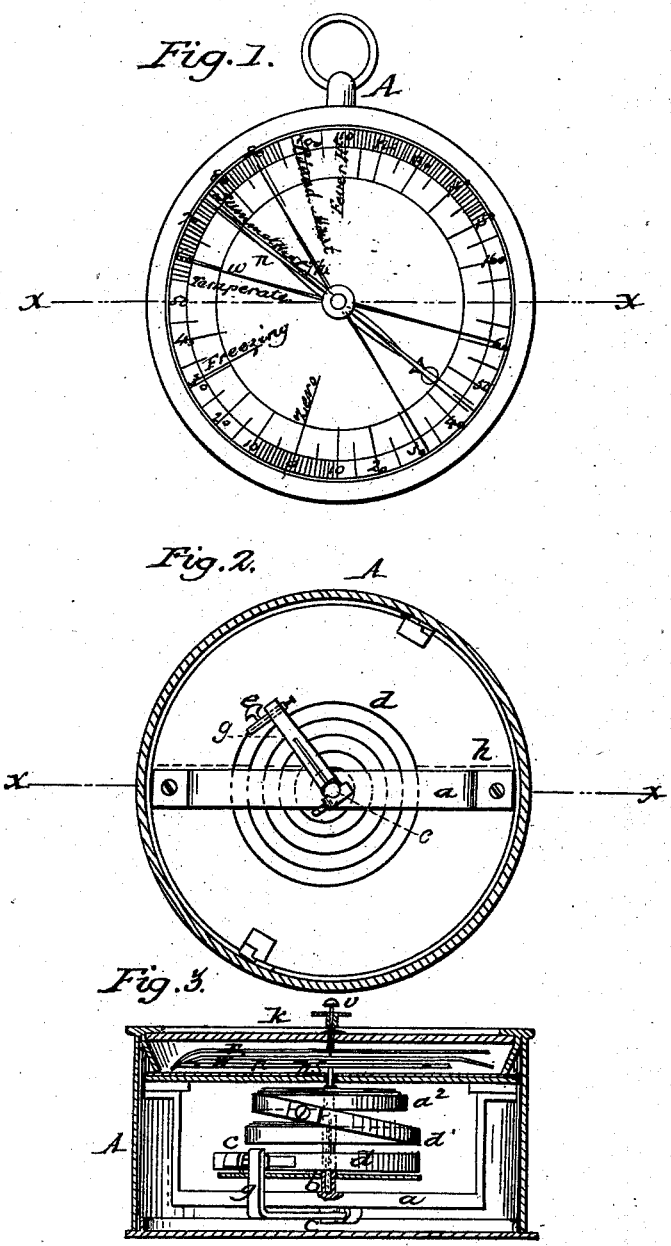

MARTIN AMES, OF NEW IPSWICH, NEW HAMPSHIRE.

*Letters Patent No. 68,681, dated September 10, 1867.*

IMPROVEMENT IN SELF-REGISTERING THERMOMETER.

*The Schedule referred to in these Letters Patent and making part of the same.*

TO ALL WHOM IT MAY CONCERN:

Be it known that I, MARTIN AMES, of New Ipswich, in the county of Hillsborough, and State of New Hampshire, have invented a new and useful Improvement in Self-Registering Thermometer; and I do hereby declare that the following is a full, clear, and exact description thereof, which will enable others skilled in the art to make and use the same, reference being had to the accompanying drawings, forming part of this specification, in which—

Figure 1 represents the index and recording hands of my improved self-registering thermometer.

Figure 2 is an inside view of the metal springs, which indicate the temperature by their contraction and expansion.

Figure 3 is a central cross-section taken in the line $x\, x$, figs. 1 and 2.

Similar letters of reference indicate corresponding parts.

This invention relates to an improvement in a thermometer for registering the extremes of temperature that may occur within any stated period, and consists in connecting coils of metal, in the form of ribbon, of different capacity for contraction and expansion under the influence of different degrees of heat, with a suspended needle or vernier for indicating the temperature above and below zero upon a circular graduated scale, and connected therewith two other independent hands or pointers, which are moved in opposite directions by the action of the needle, to be left at the lowest and highest point of divergence from the starting point of the needle, and thus indicate the change of the temperature that may take place within a given time.

In a circular case, A, is secured a frame, $a$, for supporting the short hollow shaft $b$, that has its bearing at one end in a step, $c$, upon the frame $a$, by which it is held in an upright position. A metallic ribbon coil, $d$, is attached at its inner end to the hollow shaft $b$. The outer end is attached by a set-screw, $e$, to one end of an arm, $g$, that is pivoted at the other end upon the projecting step $c$. The set-screw $e$ is used for adjusting the length and consequent motion of the coil $d$ when the needle of the thermometer is arranged with the index. Another metallic coil, $d'$, is attached at its inner end to the hollow shaft $b$, while its outer end is made fast, by soldering or otherwise, to the outer end of a similar metallic coil, $d^2$, the inner end of which is attached to a pin, $s$, one end of which pin sets in the hollow shaft $b$, while the other end projects through a plate, $h$, in the case A, and carries the needle $n$, for indicating the degree of temperature shown by a scale on the outside of the plate $h$, as seen in figs. 1 and 2. The index of the thermometer and the needle $n$ are covered by a glass plate, $k$, in the centre of which, directly over the pin $s$, is a hole, through which passes a sleeve, $o$, on the inside end of which is attached a needle, $r$, that has one end bent or turned down to catch against one side of the pointer or head of the needle $n$, while the other end is straight, to pass freely above the needle $n$ without touching. A pin, $v$, is run through the sleeve $o$, and carries on its inside end a needle, $w$, which also has one end bent to catch against the side of the needle $n$, while its other end plays over it freely without catching.

The sleeve $o$ and the pin $v$ are both provided with milled heads, by which the needles $r$ and $w$ may be moved and set with their bent ends to lie close against the hand of the needle $n$, so that, when the needle $n$ is moved by a change of temperature in either direction, it will carry with it one or the other of the needles $r\, w$, and leave it at that point on the scale indicating the fluctuation of the needle from the starting point. Thus, whichever way the needle of the thermometer may move, the independent needles, one or both, will remain stationary at the points to which they may be moved, and show the fluctuation of temperature that occurs within a given period.

Having thus described my invention, what I claim as new, and desire to secure by Letters Patent, is—

1. The independent needles $r\, w$, in combination with the thermometer needle $n$, arranged and operating as and for the purpose described.

2. The combination of the hollow shaft $b$, the pin $s$, the needle $n$, and the metallic ribbon coils $d\, d^1\, d^2$, constructed, arranged, and operating as herein shown and described.

The above specification of my invention signed by me this 12th day of July, 1867.

MARTIN AMES.

Witnesses:
WM. F. MCNAMARA,
ALEX. F. ROBERTS.